(12) United States Patent
Chapuis

(10) Patent No.: US 6,949,916 B2
(45) Date of Patent: Sep. 27, 2005

(54) SYSTEM AND METHOD FOR CONTROLLING A POINT-OF-LOAD REGULATOR

(75) Inventor: Alain Chapuis, Morgan Hill, CA (US)

(73) Assignee: Power-One Limited (KY)

( * ) Notice: Subject to any disclaimer, the term of this patent is extended or adjusted under 35 U.S.C. 154(b) by 424 days.

(21) Appl. No.: 10/293,531

(22) Filed: Nov. 12, 2002

(65) Prior Publication Data

US 2004/0090219 A1 May 13, 2004

(51) Int. Cl.[7] ................................. G05F 1/40
(52) U.S. Cl. ...................................... 323/282
(58) Field of Search ................ 323/282, 318, 323/351; 714/22

(56) References Cited

U.S. PATENT DOCUMENTS

| | | |
|---|---|---|
| 27,101 A | 2/1860 | Brown |
| 33,152 A | 8/1861 | Knight |
| 73,347 A | 1/1868 | Lane |
| 122,429 A | 1/1872 | Beidler |
| 142,513 A | 9/1873 | Robbins |
| 201,761 A | 3/1878 | Edgar et al. |
| 3,660,672 A | 5/1972 | Berger et al. |
| 4,194,147 A | 3/1980 | Payne et al. |
| 4,538,073 A | 8/1985 | Freige et al. |
| 4,538,101 A | 8/1985 | Shimpo et al. |
| 4,622,627 A | 11/1986 | Rodriguez et al. |
| 5,053,920 A | 10/1991 | Staffiere et al. |
| 5,073,848 A | 12/1991 | Steigerwald et al. |
| 5,377,090 A | 12/1994 | Steigerwald |
| 5,481,140 A | 1/1996 | Maruyama et al. |
| 5,917,719 A | 6/1999 | Hoffman et al. ............ 363/84 |
| 5,990,669 A | 11/1999 | Brown |
| 6,115,441 A * | 9/2000 | Douglass et al. ............ 377/25 |
| 6,191,566 B1 | 2/2001 | Petricek et al. |
| 6,211,579 B1 | 4/2001 | Blair |
| 6,385,024 B1 | 5/2002 | Olson ....................... 361/87 |

(Continued)

OTHER PUBLICATIONS

33702 Microprocessor Power Supply (3.0A) Analog Products MC33702 Fact Sheet; Motorola/Digital dna/ Power Management Switching; pp. 1–4.

"Motorola Switch Mode Power Supply With Multiple Linear Regulators And High Speed CAN Transceiver" Motorola, Inc. 2002; digital dna; Analog Marketing; Rev. 2.5, Nov. 2002; 33394; Multi–Output Power Supply Semiconductor Technical Data.

(Continued)

*Primary Examiner*—Adolf Berhane
(74) *Attorney, Agent, or Firm*—O'Melveny & Myers LLP

(57) ABSTRACT

A system and method is provided for using a serial bus to communicate (either passively or actively) with a point-of-load ("POL") regulator. Specifically, a power supply controller ("controller") communicates with at least one POL regulators by writing and/or reading data (either synchronously or asynchronous) over a unidirectional or bi-directional serial bus. In one embodiment of the present invention, the controller is adapted to write initial-configuration data (e.g., output voltage set-point, current limit set-point, etc.) to at least one POL regulator via the serial bus. At least a portion of the initial-configuration data is then used by the POL regulator to produce a particular output. In another embodiment of the invention, each POL regulator includes at least one register for maintaining POL information, such as unique identification information, fault protection information, output voltage set-point data, current limit set-point data, etc. The controller is then adapted to monitor and retrieve this information (i.e., fault-monitoring data) via the serial bus while the POL regulators are operating.

22 Claims, 4 Drawing Sheets

U.S. PATENT DOCUMENTS

| | | | |
|---|---|---|---|
| 6,421,259 | B1 | 7/2002 | Brooks et al. |
| 6,429,630 | B2 | 8/2002 | Pohlman et al. |
| 2002/0105227 | A1 | 8/2002 | Nerone et al. .............. 307/10.1 |
| 2004/0090219 | A1 * | 5/2004 | Chapuis ...................... 323/318 |
| 2004/0093533 | A1 * | 5/2004 | Chapuis et al. ............... 714/22 |
| 2004/0123164 | A1 * | 6/2004 | Chapuis et al. ............. 713/300 |
| 2004/0123167 | A1 * | 6/2004 | Chapuis ...................... 713/300 |
| 2004/0178780 | A1 * | 9/2004 | Chapuis ...................... 323/282 |
| 2004/0246754 | A1 * | 12/2004 | Chapuis ........................ 363/89 |

OTHER PUBLICATIONS

"Power Management Solutions For Networking Applications"; Presented by Luc Darmon Smart Networks Developer Forum Jun. 4–6, 2003 Euro–Disney Paris, France; Motorola digital dna; www.motorola.com/sndf; pp. 1–26.

Preliminary Information 1.5 A Switch–Mode Power Supply With Linear Regulator 33701; Power Supply Integrated Circuit; Motorola Semiconductor Technical Data; Analog Marketing MC33701/D Rev. 1.0, May 2003; Motorola digital dna; pp. 1–24.

"The 1 2–C Bus Specification" Version 2.1; Jan. 2000; document order No.: 9398 393 40011; Phillips Semiconductors; pp. 1–46.

"System Management Bus Specification" Smart Battery System Specifications; Revision 1.1 Dec. 11, 1998; SBS Implementers Forum; Version 1.1; pp. 1–39.

"KEKB Power Supply Interface Controller Module" by A. Akiyama, T. Nakamura, M. Yoshida, T. Kubo, N. Yamamoto and T. Katoh KEK, High Energy Accelerator Research Organization, 1–1 Ohio, Tsukuba 305, Japan.

"Magnet Power Supply Control System KEKB Accelerators" by T.T. Nakamura, A. Akiyama, T. Katoh, Ta. Kubo, N. Yamamoto, M. Yoshida, KEK, Tsukuba, Japan International Conference On Accelerator And Large Experimental Physics Control Systems, 1999, Trieste, Italy, pp. 406–408.

"Electronics Products" by Paul Birman and Sarkis Nercessian, Kepco, Inc. Flushing NY vol. 37, No. 10, Electronic Products, Mar. 1995; The Engineer's Magazine of Product Technology; Power Supply Special; DSO Samples Single Shots at 10 Gsamples/s Speech Recognition On A Single Chip LCD Has Flat–Panel Benefits At CRT Cost Product Update: High–Performance OP AMPS; A Hearst Business Publication; pp. 1, 5, 33–34.

* cited by examiner

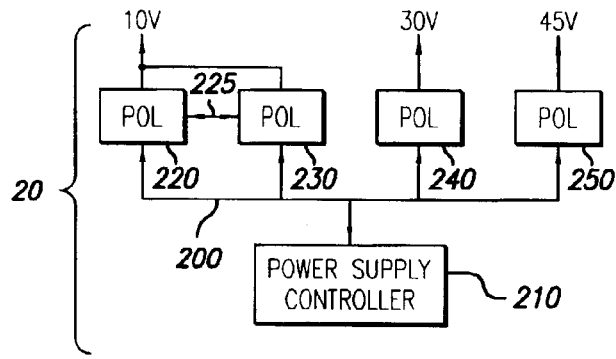
FIG. 2
FIG. 3
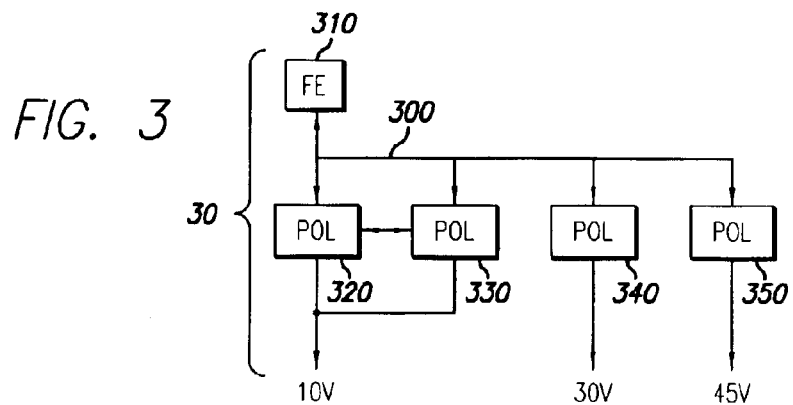
FIG. 4
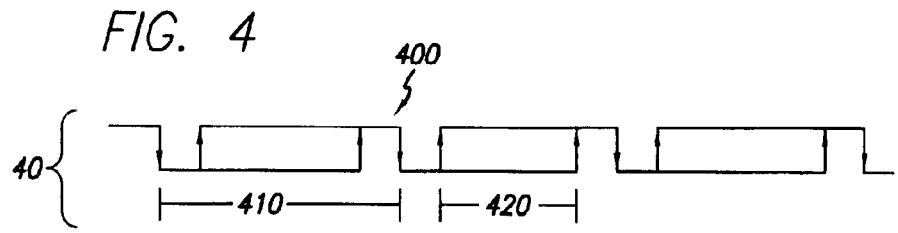

SYSTEM AND METHOD FOR CONTROLLING A POINT-OF-LOAD REGULATOR

BACKGROUND OF THE INVENTION

1. Field of the Invention

The present invention relates to controlling a point-of-load regulator, or more particularly, to a system and method for using a serial bus to communicate with a point-of-load regulator.

2. Description of Related Art

Point-of-load ("POL") regulators, which are also referred to as voltage regulators or DC/DC converters, are commonly used in conjunction with electronic circuits. This is because the voltage/current requirements of electronic circuits typically differ from the voltage that is readily available or the current that can practically be delivered. For example, some electronic devices only include a single voltage input (e.g., 12v), but require different voltages for circuits contained within (e.g., 3v, 5v, 9v, etc.). A common solution is to design multiple POL regulators within the device for converting the single input voltage into multiple voltage levels.

Similarly, some electronic devices include circuits that require low voltage (e.g., 1v), high current (e.g., 100A) power supplies. This is problematic in that it is impractical to deliver high current at low voltages over a relatively long distance and still meet desired regulation performances. A common solution is to use a high voltage, low current power supply and design a POL regulator near the internal circuit. This allows low current to travel throughout the device, and provides a low voltage, high current power supply (i.e., using the POL regulator) near the internal circuit.

Traditionally, POL regulators operate in conjunction with a power supply controller ("controller") that activates, programs, and monitors the POL regulators. Specifically, the controller uses a multi-connection parallel bus (e.g., a six bit parallel bus) to activate and program each POL regulator. The parallel bus includes an enable/disable bit for turning the regulator on and off and VID code bits for programming the output voltage set-point of the regulator. The controller further uses additional connections (e.g., three wires) to monitor the voltage/current that is being delivered by each regulator.

The drawback with such a control system is that it adds complexity and size to the overall electronic device by using, for example, a six bit parallel bus to operate each POL regulator and three additional wires to monitor each POL regulator. In other words, a controller operating in accordance with this control system utilizes twenty-seven connections (i.e., twenty-seven wires or traces) in order to communicate with three POL regulators. Thus, it would be advantageous to have a system and method for communicating with POL regulators that overcomes these drawbacks.

SUMMARY OF THE INVENTION

The present invention provides a system and method for using a serial bus to communicate (either passively or actively) with a point-of-load ("POL") regulator. Embodiments of the present invention operate in accordance with at least one POL regulator and a power supply controller ("controller") operatively connected to the POL regulator via a serial bus. Specifically, the controller communicates with at least one POL regulator by writing and/or reading data (either synchronously or asynchronous) over a uni-directional or bi-directional serial bus. In other words, the uni or bi-directional serial bus is either a two-wire serial bus that allows data to be transmitted asynchronously or a single-wire serial bus that allows data to be transmitted synchronously. In an alternate embodiment, the serial bus (or a portion thereof) is superimposed over (or coexistent with) a power bus used to deliver power from a front-end converter to at least one POL regulator.

In one embodiment of the present invention, the controller is adapted to write initial-configuration data (e.g., output voltage set-point, current limit set-point, etc.) to at least one POL regulator via the serial bus. At least a portion of the initial-configuration data is then used by the POL regulator to produce a particular output.

In another embodiment of the invention, each POL regulator includes at least one register for maintaining POL information, such as unique identification information, fault protection information, output voltage set-point data, current limit set-point data, etc. The controller is then adapted to read the information contained in the register(s) (i.e., fault-monitoring data). In other words, the controller can monitor and retrieve (or in an alternate embodiment be provided with) POL information, such as unique identification information (e.g., serial number, date of manufacture, etc.) or fault protection information (e.g., temperature, output voltage, and output current information), while the POL regulators are operating.

A more complete understanding of the system and method for using a serial bus to communicate with a POL regulator will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 2 depicts a POL control system operating in accordance with one embodiment of the present invention.

FIG. 3 depicts a POL control system operating in accordance with another embodiment of the present invention.

FIG. 4 illustrates one method of communicating over a serial bus.

DETAILED DESCRIPTION OF THE PREFERRED EMBODIMENT

The present invention provides a system and method for using a serial bus to passively or actively communicate with a point-of-load regulator. In the detailed description that follows, like element numerals are used to describe like elements illustrated in one or more figures.

Figure 1:
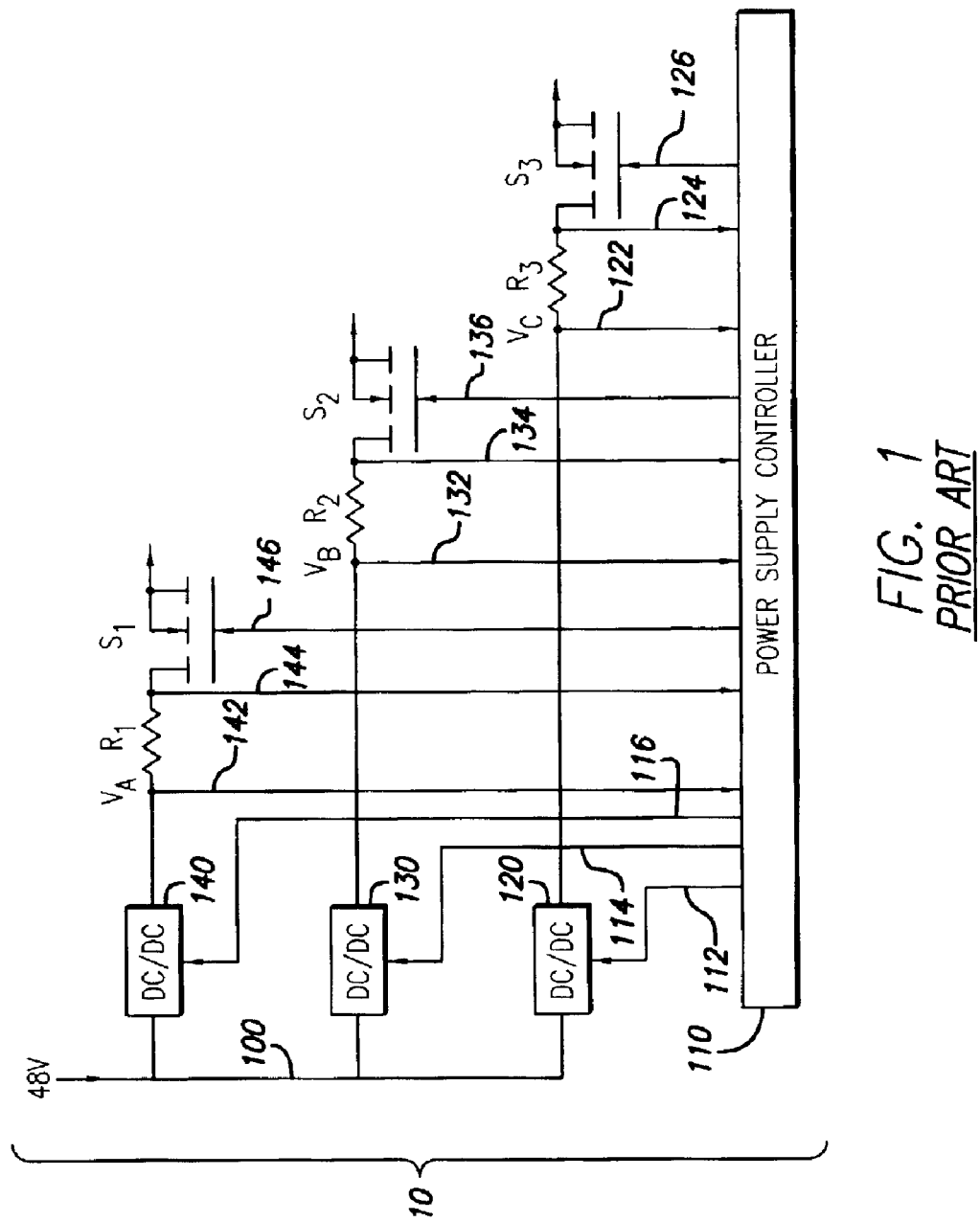
FIG. 1 depicts a prior art POL or DC/DC control system.

FIG. 1 illustrates a prior art DC/DC control system 10 where the power supply controller ("controller") 110 communicates with a plurality of DC/DC converters (i.e., 120, 130 and 140), also referred to as voltage regulators or point-of-load ("POL") regulators, via a plurality of six bit parallel buses (i.e., 112, 114 and 116) and a plurality of three-wire output connections (i.e., 122–126, 132–136, and 142–146). More particularly, each six bit parallel bus includes an enable/disable bit and five VID code bits, and each three-wire output connection includes a voltage monitoring line (i.e., 122, 132 and 142), a current monitoring line (i.e., 124, 134 and 144), and a switch enable line (i.e., 126, 136, 146).

As shown in FIG. 1, the controller 110 controls the output voltage of each DC/DC converter by activating, programming, and monitoring the converter via the six bit parallel bus and the three-wire output connection. For example, the controller 110 provides operable parameters (e.g., output voltage set-point) to the DC/DC converter 140 via the VID code portion of the six bit parallel bus 116. The controller 110 then activates the DC/DC converter 140 via the enable/disable portion of the six bit parallel bus 116. Once activated, the DC/DC converter 140 converts the voltage provided via the power supply 100 (e.g., 48v) into an output voltage $V_A$. The controller 110 then verifies that the output voltage $V_A$ is the desired voltage by measuring the voltage via the voltage monitoring line 142. If the output voltage $V_A$ is acceptable, it is provided to the load (not shown) by activating the switch $S_1$ via the switch enable line 146. The controller 110 can then continuously monitor the output voltage and the output current by measuring the voltage via the voltage monitoring line 142 and measuring the voltage drop over the sense resistor $R_1$ (i.e., the voltage differential between the current monitoring line 144 and the voltage monitoring line 142), respectively. The controller 110 communicates (i.e., programs, activates, monitors) with the remaining DC/DC converters 120, 130 in the same manner.

The problem with such a control system 10 is that it adds complexity and size to the overall electronic device (not shown) by using a six bit parallel bus (i.e., 112, 114 and 116) to operate each converter and a separate three-wire output connection (i.e., 122–126, 132–136, 142–146) to monitor each converter. In other words, the controller 110 utilizes twenty-seven connections (i.e., twenty-seven wires or traces) in order to communicate with three DC/DC converters (i.e., 120, 130 and 140).

FIG. 2 illustrates a POL control system 20 operating in accordance with one embodiment of the present invention. Specifically, a controller 210 communicates with a plurality of POL regulators (i.e., 220, 230, 240 and 250) via a serial bus 200. It should be appreciated that the POL regulators depicted herein (e.g., 220, 320, etc) include, but are not limited to, point-of-load regulators, power-on-load regulators, DC/DC converters, voltage regulators, and all other programmable voltage regulating devices generally known to those skilled in the art. It should further be appreciated that the controller (e.g., 210) may exist as a stand-alone device (as depicted in FIG. 2) or integrated into a front-end converter (as depicted in FIG. 3).

Referring to FIG. 2, the controller 210 communicates with the plurality of POL regulators by writing and/or reading data (either synchronously or asynchronous) via a uni-directional or bi-directional serial bus 200. In other words, the uni or bi-directional serial bus 200 is either a two-wire serial bus (e.g., I²C) that allows data to be transmitted asynchronously or a single-wire serial bus that allows data to be transmitted synchronously (i.e., synchronized to a clock signal). FIG. 3 shows an alternate control system 30 where the serial bus (or a portion thereof) is superimposed over (or coexistent with) the power bus 300 used to deliver power from the front-end converter 310 to the POL regulators (i.e., 320, 330, 340 and 350).

FIG. 4 illustrates one method of communicating over a single-wire serial bus. Specifically, a transmission line 40 is created by propagating a clock signal 400 over the serial bus. The clock signal 400 can be generated by the controller, a particular POL regulator (e.g., the POL regulator with the least significant address), or an external device. The clock signal 400 synchronizes the various communicating devices (i.e., the POL regulators and the controller) and creates a series of clock cycles 410, each one including a data bit 420. This allows the various communicating devices to transmit a single bit of data for every clock cycle 410. In other words, each communicating device transmits data by leaving/pulling the data bit 420 high or low (i.e., binary one or zero). It should be appreciated that FIG. 4, as discussed herein, is not intended to limit the present invention, but to provide an example as to how communication can occur over a single-wire serial bus.

Figure 5:
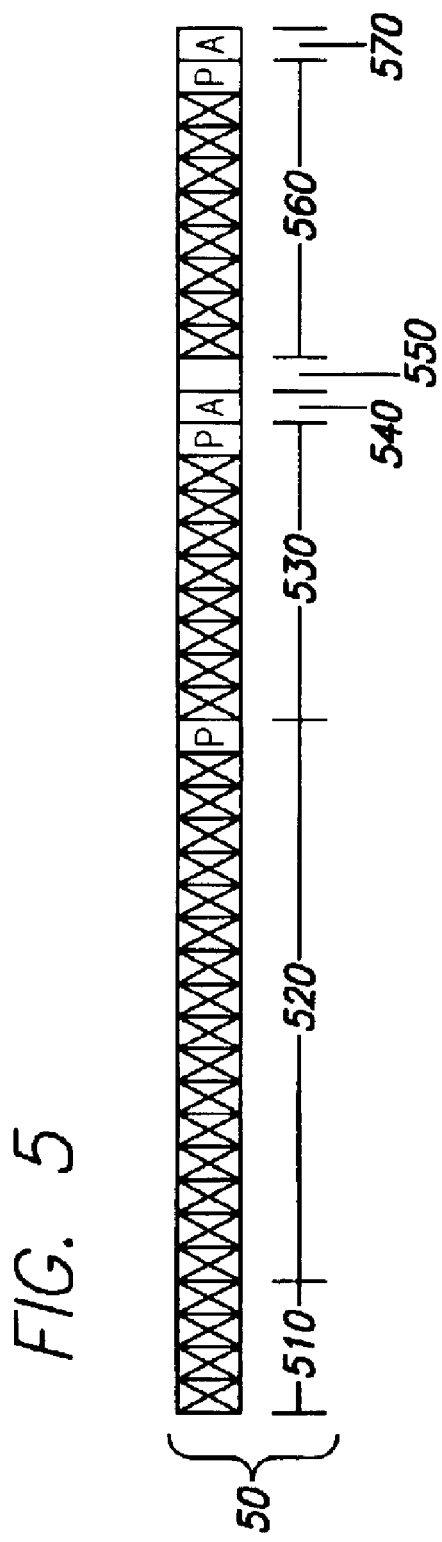
FIG. 5 illustrates one communication cycle that can be transmitted to a POL regulator over a serial bus.

FIG. 5 illustrates one method of transmitting information between the controller and at least one POL regulator. Specifically, a forty-two bit communication cycle 50 can be used to transmit initial-configuration data, fault-monitoring data, and/or sender identification data. As shown in FIG. 5, the forty-two bit transmission cycle 50 includes a four bit start sequence 510, a sixteen bit (with parity) address set 520, an eight bit (with parity) command set 530, a first acknowledgement bit 540, an eight bit (with parity) data set 560, and a second acknowledgment bit 570. An additional bit 550 has been added to ensure that the command set 540 is executed before the data set 560 is provided. It should be appreciated that the communication cycle 50 depicted in FIG. 5 is not intended to limit the present invention, but to illustrate how information can be transmitted over a serial bus. Therefore, communication cycles containing more or less information and/or bits is within the spirit and scope of the present invention.

The first and second acknowledgement bits 540, 570 are used to acknowledge the reception of the command set 530 and the data set 560, respectively. It should be appreciated that the device responsible for providing the first and second acknowledgement bits 540, 570 varies depending upon whether the information is being sent to or from the POL regulator (i.e., written, read, or provided).

The command set 530, data set 560, and address set 520 enable the controller and the POL regulators to write, read and provide data. Specifically, (i) the command set 530 is used to identify whether and what the controller is writing, the controller is reading, or the POL regulator is providing, (ii) the address set 520 is used to identify the POL regulator (s) that are being written to or read, or the POL regulator that is providing information, and (iii) the data set 560 is used to identify the actual data that is being written, read, or provided.

The start sequence 510 and address set 520 are used, in part, to identify the sender of the information. For example, the controller uses a different start sequence 510 than the POL regulators. Thus, the controller can determine, by reading the start sequence 510 of a communication cycle 50 as it is being sent, whether a POL regulator is also attempting to send a communication cycle 50 at the same time. Similarly, each POL regulator has a different address set 520. Thus, a POL regulator can determine, by reading the start sequence 510 and address set 520 of a communication cycle 50 as it is being sent, whether another POL regulator is also attempting to send a communication cycle 50 at the same time. If multiple devices are attempting to send a communication cycle 50, default prioritizing information is used to allocate or arbitrate bus use.

Referring back to FIG. 2, which illustrates one embodiment of the present invention, the controller 210 is adapted to write initial-configuration data (e.g., output voltage set-point, current limit set-point, etc.) to at least one POL regulator (e.g., 240) via the serial bus 200. At least a portion of the initial-configuration data is then used by the POL regulator (e.g., 240) to produce a particular output (i.e., 30v). The output power can be increased if the output of two or more POL regulators (e.g., 220, 230) are connected in parallel. To assure that the load is shared equally, an inter-device bus 225 (e.g., a current share bus) can be provided between the POL regulators.

In another embodiment of the invention, each POL regulator (e.g., 220) includes at least one register (not shown) for storing POL information, such as unique identification information, fault protection information, output voltage set-point data, current limit set-point data, etc. The controller 110 is then adapted to read the data contained in the register(s) (i.e., fault-monitoring data). In other words, the controller 110 can monitor and retrieve POL information, such as unique identification information (e.g., serial number, date of manufacture, etc.) or fault protection information (e.g., temperature, voltage, and current information), while the POL regulators are operating. The POL regulators (i.e., 220, 230, 240 and 250) may further be adapted to provided fault-monitoring data independent of receiving a read command. In other words, the POL regulators, on their own initiative, can provide the controller 210 with unique identification information and/or fault protection information.

Figure 6:
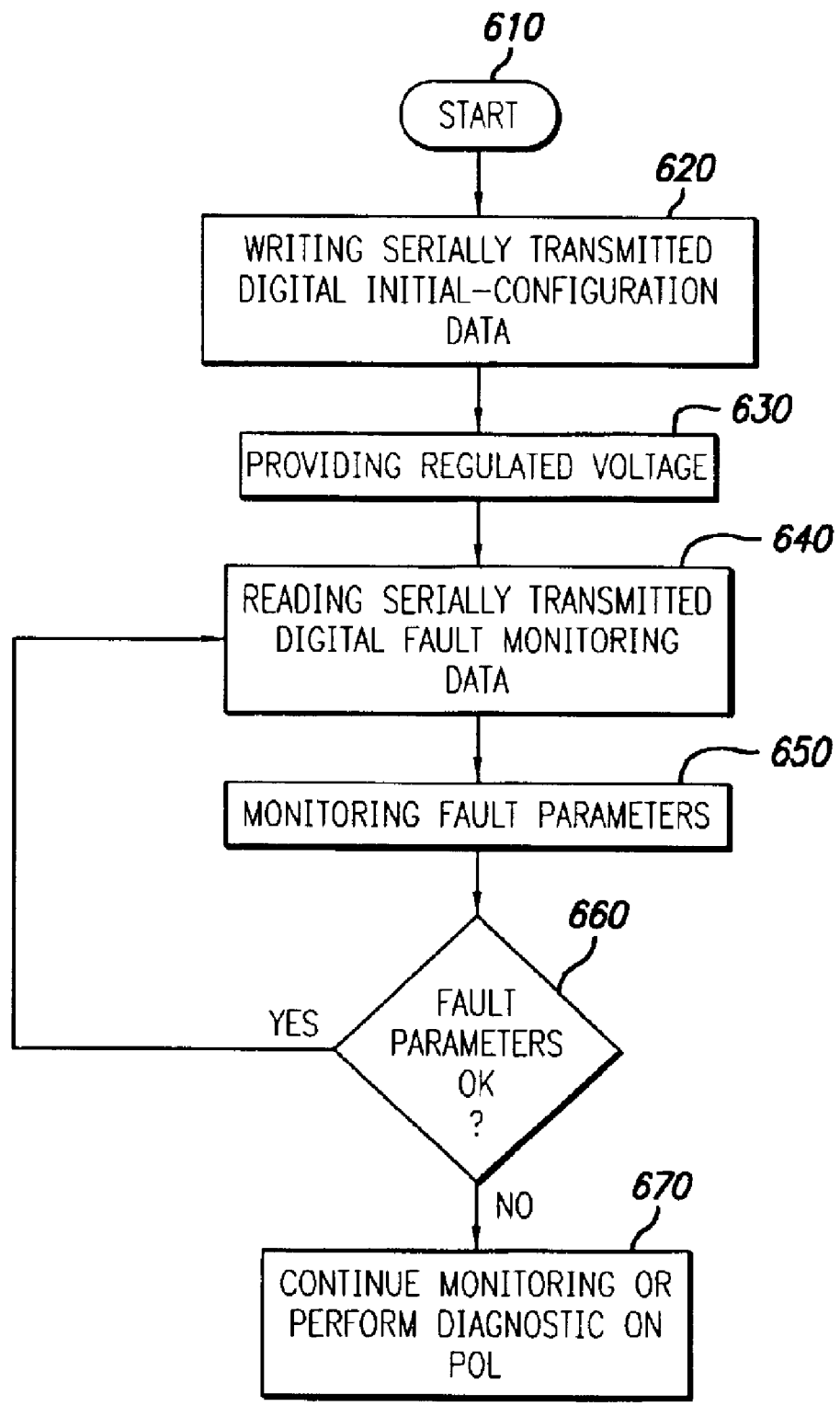
FIG. 6 is a flow chart depicting one method of communicating with a POL regulator in accordance with the present invention.

One method of communicating with at least one POL regulator is described in FIG. 6. Specifically, at step 610, the controller begins by writing (i.e., transmitting) digital initial-configuration data (e.g., output voltage set-point, current limit set-point, etc.) to at least one POL regulator. The POL regulator then provides regulated power or voltage in conjunction with at least a portion of the initial-configuration data at step 620. The controller, at step 630, then receives fault-monitoring data (e.g., voltage output data, current output data, temperature data, etc.). The fault-monitoring data is either provided by the POL regulator on its own initiative or in response to receiving a read command. The controller then evaluates the fault-monitoring data at step 640. At step 650, if the fault parameters are acceptable, the controller requests (or receives) additional fault-monitoring data at step 630. Alternatively, if the fault parameters are unacceptable, the controller must decide what action needs to be taken (e.g., closely monitoring the regulator, disabling the regulator, performing a diagnostic check, etc.) at step 660. It should be appreciated that the POL regulator may also be programmed to take certain action (e.g., shut down) if certain fault parameters are found to exist.

Having thus described a preferred embodiment of a system and method for using a serial bus to communicate with a point-of-load regulator, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power control system comprising:
    a plurality of point-of-load regulators providing corresponding regulated output voltages; and
    a bi-directional, serial data bus connected to each of said plurality of point-of-load regulators to permit communication of control and monitoring data therebetween, each one of said plurality of point-of-load regulators being adapted to initiate a communication cycle by providing a synchronizing signal onto said serial data bus followed by a multi-bit data message that includes at least one of an address set, a command set, and a data set.

2. The power control system of claim 1, further comprising a controller connected to said serial data bus, said controller also being adapted to initiate a communication cycle by providing a synchronizing signal onto said serial data bus followed by a multi-bit data message that includes at least one of an address set, a command set, and a data set.

3. The power control system of claim 2, wherein said controller further comprises a point-of-load regulator.

4. The power control system of claim 1, wherein each one of said plurality of point-of-load regulators includes at least one register adapted to store at least one of output voltage set-point data, output current set-point data, and fault protection data.

5. The power control system of claim 1, wherein said synchronizing signal further comprises a clock pulse that pulls said serial data bus to a low state.

6. The power control system of claim 1, wherein said address set further comprises plural data bits identifying one of said plurality of point-of-load regulators to which control data is being written.

7. The power control system of claim 1, wherein said address set further comprises plural data bits identifying one of said plurality of point-of-load regulators that initiates the communication cycle.

8. The power control system of claim 1, wherein said command set further comprises plural data bits defining a desired function to be performed by one of said plurality of point-of-load regulators.

9. The power control system of claim 1, wherein said data set further comprises plural data bits defining data to be written to or read from one of said plurality of point-of-load regulators.

10. The power control system of claim 9, wherein said data set includes at least one of output voltage set-point data, output current set-point data, and fault protection data.

11. The power control system of claim 9, wherein said data set includes initial configuration data.

12. The power control system of claim 1, wherein said serial data bus further comprises a single wire data bus.

13. The power control system of claim 1, wherein said serial data bus further comprises a two wire data bus.

14. A point-of-load regulator having a serial data interface adapted to communicate control and monitoring data with other like point-of-load regulators via a serial data bus, said point-of-load regulator initiating a communication cycle by providing a synchronizing signal through said serial data interface followed by a multi-bit data message that includes at least one of an address set, a command set, and a data set.

15. The point-of-load regulator of claim 14, further comprising at least one register adapted to store at least one of output voltage set-point data, output current set-point data, and fault protection data.

16. The point-of-load regulator of claim 14, wherein said synchronizing signal further comprises a clock pulse that pulls said serial data bus to a low state.

17. The point-of-load regulator of claim 14, wherein said address set further comprises plural data bits identifying another point-of-load regulator to which control data is being written.

18. The point-of-load regulator of claim 14, wherein said address set further comprises plural data bits identifying said point-of-load regulator.

19. The point-of-load regulator of claim 14, wherein said command set further comprises plural data bits defining a desired function to be performed by another point-of-load regulator.

20. The point-of-load regulator of claim 14, wherein said data set further comprises plural data bits defining data to be written to or read from said point-of-load regulator.

21. The point-of-load regulator of claim 14, wherein said data set includes at least one of output voltage set-point data, output current set-point data, and fault protection data.

22. The point-of-load regulator of claim 14, wherein said data set includes initial configuration data.

* * * * *

UNITED STATES PATENT AND TRADEMARK OFFICE
Certificate

Patent No. 6,949,916 B2                                                           Patented: September 27, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Alain Chapuis, Morgan Hill, CA (US); and Mikhail Guz, Daly City, CA (US).

Signed and Sealed this Fourth Day of September 2007.

<div align="right">
KARL D. EASTHOM<br>
<i>Supervisory Patent Examiner</i><br>
Art Unit 2838
</div>